United States Patent [19]

Viegas et al.

[11] Patent Number: 5,730,216
[45] Date of Patent: Mar. 24, 1998

[54] AIR CONDITIONING AND REFRIGERATION UNITS UTILIZING A CRYOGEN

[75] Inventors: Herman H. Viegas; Bradley G. Ellingson, both of Bloomington, Minn.

[73] Assignee: Thermo King Corporation, Minneapolis, Minn.

[21] Appl. No.: 501,372

[22] Filed: Jul. 12, 1995

[51] Int. Cl.[6] .................................................. F25B 29/00
[52] U.S. Cl. ..................... 165/233; 165/255; 165/42; 165/293; 165/61; 165/64; 62/50.3; 62/239; 62/50.2
[58] Field of Search ............................ 62/50.3, 167, 239; 165/61, 64, 58, 62, 233, 255, 293, 42, 43

[56] References Cited

U.S. PATENT DOCUMENTS

| | | | |
|---|---|---|---|
| 5,074,329 | 12/1991 | Havemann et al. | 62/324.6 |
| 5,123,252 | 6/1992 | Hanson | 62/89 |
| 5,267,443 | 12/1993 | Roehrich et al. | 62/50.3 |
| 5,267,446 | 12/1993 | Viegas et al. | 62/50.2 |
| 5,285,644 | 2/1994 | Roehrich et al. | 62/50.3 |
| 5,287,705 | 2/1994 | Roehrich et al. | 62/50.3 |
| 5,305,825 | 4/1994 | Roehrich et al. | 165/64 |
| 5,311,927 | 5/1994 | Taylor et al. | 165/61 |
| 5,315,840 | 5/1994 | Viegas et al. | 62/50.2 |
| 5,320,167 | 6/1994 | Johnson et al. | 165/61 |
| 5,365,744 | 11/1994 | Viegas et al. | 62/50.3 |
| 5,458,188 | 10/1995 | Roehrich et al. | 165/61 |
| 5,598,709 | 2/1997 | Viegas et al. | 62/50.2 |

Primary Examiner—John K. Ford

[57] ABSTRACT

Air conditioning and refrigeration apparatus for controlling the temperature of a conditioned space to a predetermined temperature band adjacent to a predetermined set point temperature via cooling and heating cycles utilizing a supply of pressurized cryogen. A cryogen driven motor drives a fan and an alternator. The alternator provides control voltage for operating electrical control devices which select a heating cycle, or a cooling cycle, as required, and which control the flow of cryogen during the selected cycle. Electrical load on the alternator, and thus a load on the vapor driven motor, is minimized to maintain air delivered by the fan to the conditioned space at a level which provides a substantially uniform air flow and temperature throughout the conditioned space. A cryogen flow control valve is motor controlled and only requires electrical energy when a change in the cryogen flow rate is desired. Heating and cooling cycle selecting valves require no electrical energy during a cooling cycle, and very little electrical energy during a heating cycle, as cryogen pressure is utilized to shift the heating and cooling cycle selecting valves when a heating cycle is desired.

18 Claims, 1 Drawing Sheet

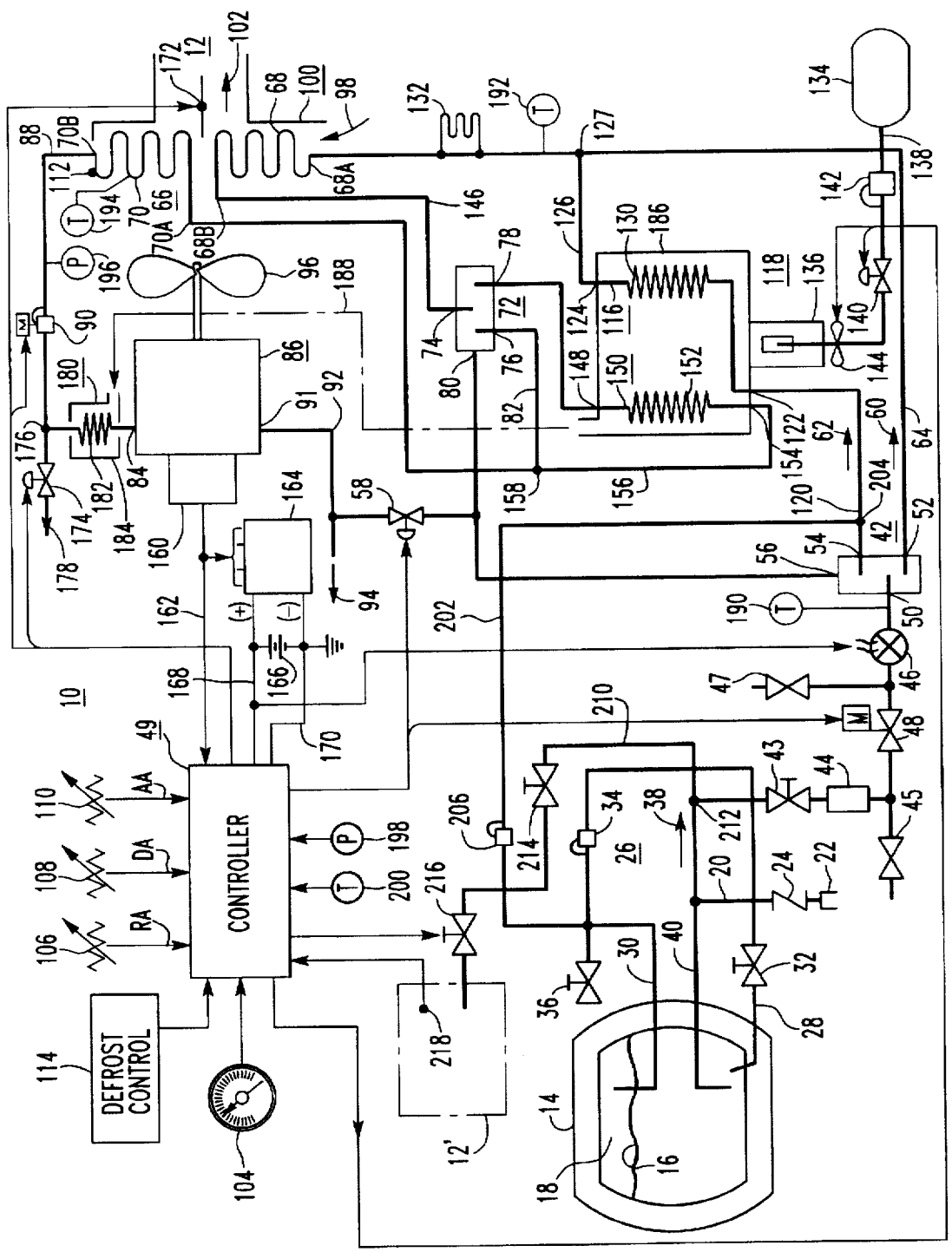

AIR CONDITIONING AND REFRIGERATION UNITS UTILIZING A CRYOGEN

TECHNICAL FIELD

The invention relates in general to air conditioning and refrigeration units, and more specifically to the use of a cryogen for controlling the temperature of a conditioned space of stationary and transport type applications of air conditioning and refrigeration units.

BACKGROUND ART

Stationary and transport applications of air conditioning and refrigeration units or systems control the temperature of a conditioned space to a predetermined temperature range adjacent to a predetermined set point temperature, with transport applications including those used with straight trucks, tractor-trailer combinations, refrigerated containers, and the like. Such air conditioning and refrigeration systems conventionally utilize a chlorofluorocarbon (CFC) refrigerant in a mechanical refrigeration cycle. The mechanical refrigeration cycle requires a refrigerant compressor driven by a prime mover, which often includes an internal combustion engine, such as a diesel engine. Because of the suspected depleting effect of CFC's on stratospheric ozone ($O_3$), practical alternatives to the use of CFC's in air conditioning and refrigeration systems are being sought.

The use of a cryogen, ie., a gas which has been compressed to a very cold liquid state, such as carbon dioxide ($CO_2$) and nitrogen ($N_2$), in air conditioning and refrigeration systems is particularly attractive because, in addition to eliminating the need for a CFC, it also eliminates the need for a compressor and associated prime mover.

U.S. Pat. No. 5,365,744, which is assigned to the same assignee as the present application, teaches methods and apparatus for reducing the amount of cryogen consumed during a heating cycle of a refrigeration unit which utilizes a supply of pressurized cryogen. A flow path for the cryogen includes heat exchanger means in the flow path associated with the conditioned space. Control means selectively configures the flow path to provide cooling and heating cycle flow paths, with heating means being in the heating cycle flow path. The heating means and the heat exchanger means each have at least first and second flow paths. The control means configures the active flow path during a heating cycle to successively direct cryogen in first and second passes through the heating means and the heat exchanger means. The first flow paths of the heating means and the heat exchanger means are respectively followed during the first pass, and the second flow paths of the heating means and the heat exchanger means are respectively followed during the second pass.

While it is very important to conserve cryogen, it is also very important to operate a cryogen based refrigeration unit while consuming as little electrical energy as possible. A cryogen based refrigeration unit preferably provides air flow in a conditioned space by driving a pneumatic type motor and associated blower or fan with cryogen vapor, and the cryogen driven motor drives an electrical generator or alternator which provides electrical control power for associated electrical control circuits and devices. The greater the electrical load on the alternator the slower the cryogen vapor driven motor turns. If the electrical load is too great, the air flow in the conditioned space may not adequately reach the end of the associated conditioned space opposite the air entry point. Thus, it is very important to maintain adequate air flow volume and velocity to assure that the conditioned air uniformly conditions the associated load across the entire load space. Also, when cooling with a cryogen flowing through a heat exchanger coil, a relatively high temperature differential $\Delta T$ results across the heat exchanger means which conditions the air of the conditioned space. If a predetermined minimum CFM of air is not maintained when the heat exchanger means has a high temperature differential $\Delta T$, uniformity of cooling suffers and top-freezing of temperature sensitive loads may occur.

Thus, it would be desirable, and it is an object of the invention, to provide a new and improved cryogenic based air conditioning and refrigeration unit or system, suitable for both transport and stationary applications, which more effectively and efficiently utilizes electrical energy, to maintain adequate air delivery with a cryogen vapor driven motor, fan and alternator, to provide uniform heating and cooling of a conditioned space during heating and cooling cycles initiated to maintain the temperature of the conditioned space in a predetermined temperature band adjacent to a predetermined set point temperature.

SUMMARY OF THE INVENTION

Briefly, the invention includes a refrigeration unit for controlling the temperature of a conditioned space to a predetermined temperature band adjacent to a predetermined set point temperature via heating, cooling and null cycles, including a supply of pressurized cryogen. A flow path for the cryogen includes heat exchanger means associated with the conditioned space. Cryogen heating means is provided in the cryogen flow path during a heating cycle. A cryogen vapor driven motor and fan in the cryogen flow path provides air circulation between the heat exchanger means and the conditioned space during heating and cooling cycles. Electrical generator means is driven by the cryogen vapor driven motor, and electrical control means for operating the refrigeration unit is connected to the electrical generator means. The electrical control means selectively configures the cryogen flow path to provide heating and cooling cycle flow paths, as required to maintain the temperature of the conditioned space in the predetermined temperature band adjacent to the set point temperature with the heating means being in the heating cycle flow path. When the conditioned space does not require a heating cycle or a heating cycle to maintain the temperature of the conditioned space within the predetermined temperature band adjacent to the set point temperature, the unit shuts down and enters a null cycle. The heat exchanger means includes first and second heat exchanger sections each having inlet and outlet ends. The control means includes a three-way valve having an inlet connected to the outlet end of the first heat exchanger section, a first outlet connected to the inlet end of the second heat exchanger section, a second outlet connected to the cryogen heating means, and a vent outlet. The three-way valve is spring biased to select the first outlet when the vent outlet is closed, and the three-way valve is operated by cryogen pressure to select the second outlet when the vent outlet is open. Controllable vent valve means is connected to the vent outlet, with the controllable vent valve means, when operated, opening the vent outlet, to vent the three-way valve to the atmosphere. The controllable vent valve means is preferably electrically operated, closing the vent outlet when de-energized, and opening the vent outlet when energized, but a pneumatically operated valve may also be used.

In a preferred embodiment of the invention, the electrical control means includes a second three-way valve, with the heating means including first and second cryogen heating flow paths each having inlet and outlet ends. The second three-way valve includes an inlet connected to the supply of pressurized cryogen, a first outlet connected to the inlet end of the first heat exchanger section, a second outlet connected to the inlet end of the first cryogen heating flow path, and a vent outlet which, when closed and open, respectively connects the inlet to the first and second outlets. The outlet ends of the first and second cryogen heating flow paths are connected to the inlet ends of the first and second heat exchanger sections. The second outlet of the first three-way valve, ie., the three-way valve which is connected between the first and second heat exchanger sections, is connected to the inlet end of the second cryogen heating flow path. The controllable vent valve means is a single vent valve, with this single vent valve also being connected to the vent outlet of the second three-way valve. Thus, the vent outlets of both three-way valves are connected to the atmosphere when the single vent valve is opened.

In still another embodiment of the invention, the cryogen vapor driven motor is connected in the cryogen flow path downstream from the second section of the heat exchanger means.

BRIEF DESCRIPTION OF THE DRAWINGS

The invention will become more apparent by reading the following detailed description in conjunction with the drawings, which are shown by way of example only, wherein the single Figure is a diagrammatic representation of a cryogenic refrigeration unit constructed according to the teachings of the invention.

DESCRIPTION OF PREFERRED EMBODIMENTS

As used in the following description and claims, the term "conditioned space" includes any space to be temperature and/or humidity controlled, including stationary and transport applications for the preservation of foods and other perishables, maintenance of a proper atmosphere for the shipment of industrial products, space conditioning for human comfort, and the like. The term "refrigeration unit" is used to generically cover both air conditioning systems for human comfort, and refrigeration systems for preservation of perishables and shipment of industrial products. Also, when it is stated that the temperature of a conditioned space is controlled to a selected set point temperature, it is to be understood that the temperature of the conditioned space is controlled to a predetermined temperature band or range adjacent to the selected set point temperature. The predetermined temperature band defines the limits of a null cycle during which the unit is shut down to conserve cryogen, as the temperature of the conditioned space is satisfied and the unit does not require a heating cycle or a cooling cycle during this time.

The invention is suitable for use when a refrigeration system is associated with a single conditioned space to be controlled to a selected set point temperature; and, the invention is also suitable for use when a refrigeration system is associated with a compartmentalized application, ie., a conditioned space is divided into at least first and second separate conditioned spaces to be individually controlled to selected set point temperatures. In a compartmentalized application, for example, one conditioned space may be used to condition a frozen load, and the other a fresh load, or combinations thereof, as desired.

Referring now to the single Figure, there is shown a refrigeration unit or system 10 suitable for use with any conditioned space, and particularly well suited for use on a vehicle such as a straight truck, a tractor-trailer combination, a container, and the like, with the word "vehicle" being used to generically refer to the various types of transport vehicles which utilize refrigeration units. As hereinbefore stated, refrigeration unit 10 may be used to condition a single conditioned space 12 to be conditioned to a predetermined set point temperature SP, and also to condition two or more separate conditioned spaces to selected set point temperatures. For purposes of example only, the embodiment of the invention set forth in the Figure illustrates refrigeration unit 10 controlling the temperatures of a compartmentalized space which includes a first conditioned space 12 and a second conditioned space 12'.

More specifically, refrigeration unit 10 includes a vessel 14 containing a suitable pressurized cryogen, such as nitrogen ($N_2$), or carbon dioxide ($CO_2$), for example, with a liquid phase thereof being indicated at 16, and with a vapor phase, located above the liquid level, being indicated at 18. Vessel 14 may be filled, for example, by connecting a conventional ground support apparatus to an input conduit 20 which includes a fill connector 22 and a check valve 24.

Vapor pressure in vessel 14 is maintained above a predetermined pressure by a pressure regulating arrangement 26 connected between lower and upper points of vessel 14 via conduits 28 and 30, respectively. When the cryogen used is $CO_2$, for example, the pressure in vessel 14 must be maintained above the triple point for $CO_2$, ie., 75.13 psia. A shut-off valve 32 and a pressure building regulator valve 34 are connected between conduits 28 and 30. Pressure building valve 34 opens when the pressure in vessel 16 falls to a predetermined value, admitting liquid cryogen into conduits 28 and 30 which vaporizes when exposed to ambient temperature outside of vessel 14. Pressure building regulator valve 34 maintains the vapor pressure in vessel 14 at a predetermined level selected for optimal system operation and/or to prevent the formation of solid $CO_2$ in vessel 14 when the cryogen is $CO_2$. A venting valve 36 is also provided to facilitate the vessel filling process. Using $CO_2$ as an example for the cryogen, vessel 14 may be filled with $CO_2$ at an initial pressure of about 100 psia and an initial temperature of about −58° F. (−50° C.). Of course, other pressures and temperatures may be used than in this example, such as an initial pressure of about 300 psia and an initial temperature of about 0° F. (−17.8° C.).

A cryogen fluid flow path 38 is provided which draws liquid cryogen 16 from vessel 14 via a conduit 40. Conduit 40 extends from a low point of vessel 14 to an input of a first heat/cool valve arrangement 42, via a manual shut-off valve 43, a filter 44, a cryogen flow control valve 48, and a safety valve 46 which stops flow of cryogen in the event of electrical power failure, as will be hereinafter explained. Flow control valve 48 controls the mass flow rate of liquid cryogen during heating and cooling cycles, and is preferably a motor operated valve. A motor operated valve is preferred as electrical energy is only required to be expended when a change in the opening size of the valve is required. Flow control valve 48, and other controllable valves in the Figure, are controlled by a microprocessor controller 49, hereinafter called controller 49. Cryogen pressure relief valves are located at predetermined locations within the cryogen flow path, such as relief valves 45 and 47 located upstream and downstream from cryogen flow control valve 48.

While the first/heat cool valve arrangement 42 may include two coordinated solenoid valves, one of the two valves must always be electrically energized, expending electrical energy. Thus, in a preferred embodiment of the invention, the first heat/cool valve arrangement 42 is a three-way valve, as illustrated, having an inlet 50 connected to conduit 40, and first and second outlets 52 and 54. Thus, the first heat/cool selecting valve arrangement 42 will hereinafter be called three-way valve 42. Three-way valve 42 is spring biased to connect inlet 50 to the first outlet 52 when a vent outlet 56 on three-way valve 42 is closed. The first outlet 52 is selected when a cooling cycle is required to maintain the set point temperature SP in conditioned space 12.

When vent outlet 56 is opened, cryogen pressure operates three-way valve 42 to connect inlet 50 to the second outlet 54. The second outlet 54 is selected when a heating cycle is required to maintain the set point temperature SP in conditioned space 12, or for defrosting purposes. Thus, electrical energy is not required or used to shift three-way valve 42. The only electrical energy required is for energizing an electrically controllable, normally closed vent valve 58 during a heating cycle, with vent valve 58 connecting vent outlet 56 to the atmosphere, when opened. While vent valve 58 is preferably electrically operated, such as a solenoid valve, when a supply of compressed air is available, valve 58 may be a pneumatically operated valve. Vent outlet 56 is connected to a very small internal bleed orifice. When vent valve 58 opens, pressure at the end of three-way valve 42 which is associated with the vent outlet 56, is relieved to the atmosphere. This pressure change causes a spool within three-way valve 42 to shift. Thus, very little cryogen is lost to the atmosphere via vent outlet 56 during a heating/defrost cycle. U.S. Pat. No. 5,074,329, which is assigned to the same assignee as the present application, discloses a three-way valve which may be used.

The flow path 38 divides into first and second flow paths 60 and 62 at the outlets 52 and 54 of three-way valve 42, with the first flow path 60 being a cooling cycle flow path, and with the second flow path 62 being a heating cycle flow path. The cooling cycle flow path 60 will first be described. The cooling cycle outlet 52 is connected to a conduit 64 which directs cryogen from vessel 14 to heat exchanger means 66. Heat exchanger means 66 includes first and second heat exchanger coil sections 68 and 70, respectively. The first heat exchanger coil section 68 has an inlet 68A and an outlet 68B. The second heat exchanger coil section 70 has an inlet 70A and an outlet 70B. Conduit 64 is connected to inlet 68A of the first heat exchanger coil section 68.

The first flow path 60 continues from outlet 68B of the first heat exchanger coil section 68 to a second heat/cool valve arrangement 72. For the same reasons described relative to the first heat/cool valve arrangement 42, valve arrangement 42 is preferably a three-valve constructed as hereinbefore described relative to three-way valve 42. Thus, the second heat/cool valve arrangement 72 will be hereinafter called three-way valve 72. Three-way valve 72 has an inlet 74 connected to receive cryogen from outlet 68B of the first heat exchanger coil section 68 via conduit 146. Three-way valve 72 also has first and second outlets 76 and 78, respectively, and a vent outlet 80. Vent outlet 80 is connected to the same normally closed controllable vent valve 58 that the vent outlet 56 of three-way valve 42 is connected to, thus conserving electrical energy by having a single vent valve 58 perform two functions.

Inlet 74 of three-way valve 72 is connected to the first outlet 76 when vent outlet 80 is closed by vent valve 58, and inlet 74 is connected to the second outlet 78 when vent valve 58 is opened by controller 49 to vent three-way valve 72 to the atmosphere. The first outlet 76 continues the cooling cycle flow path 60, while the second outlet 78 continues the heating cycle flow path 62.

The cooling cycle flow path 60 continues from outlet 68B of the first heat exchanger coil section 68, via the first outlet 76 of three-way valve 72, to a conduit 82 which is connected to inlet 70A of the second heat exchanger coil section 70. Outlet 70B of the second heat exchanger coil section 70 is connected to an inlet 84 of cryogen vapor driven motor means 86 via a conduit 88 which includes a back pressure regulating valve 90. Back pressure regulating valve 90 may automatically regulate the cryogen vapor pressure above a predetermined value; or, as illustrated, back pressure regulating valve may be motor operated and controlled by controller 49. In most applications of refrigeration unit 10 a mechanical type, automatic back pressure regulating valve 90 is sufficient. When higher precision temperature control of conditioned space 12 is required than obtainable by a mechanical back pressure regulating valve, a motor operated back pressure regulating valve 90 is utilized.

An outlet 91 of vapor driven motor means 86 is connected to a conduit 92, which exhausts expended cryogen vapor to the atmosphere, as indicated by arrow 94. To reduce noise level, conduit 92 may be connected to a noise reducing muffler (not shown) before the expended cryogen is exhausted to the atmosphere. Vent valve 58 is illustrated connected to conduit 92 so that all cryogen exiting refrigeration unit 10 may be passed through a single muffler. Cryogen vapor driven motor means 86 expands the vaporized cryogen, driving a blower or fan 96 while reducing the pressure and temperature of the cryogen.

Cryogen vapor driven motor means 86 and fan 96 draws air 98, called return air, from conditioned space 12 into an air conditioning means or apparatus 100, which apparatus includes the first and second heat exchanger coil sections 68 and 70. Conditioned air 102, called discharge air, is discharged back into conditioned space 12 by cryogen vapor driven motor means 86 and fan 96.

The cooling cycle cryogen flow path 60 provides a cooling cycle for conditioned space 12, when the temperature of conditioned space 12 is above a predetermined narrow temperature band relative to a set point temperature SP as selected via a set point temperature selector 104. Cryogen flow regulating expansion valve 48 is motor controlled by controller 49 and a temperature control algorithm as a function of system conditions at any instant. U.S. Pat. No. 5,123,252, which is assigned to the same assignee as the present application discloses temperature control algorithms which may be used. For example, motor operated expansion valve 48 may be controlled as a function of the desired set point temperature SP, and the actual temperature of conditioned space 12 as measured by a return air temperature sensor 106 and/or a discharge air temperature sensor 108, which sensors are disposed in the return air and discharge air streams indicated by arrows 98 and 102. When the applicable temperature control algorithm requires that ambient temperature AA be known, the ambient temperature AA may be sensed by an ambient air temperature sensor 110. When the temperature in conditioned space is initially being pulled down, flow control valve 48 is opened to provide a relatively high mass flow rate of cryogen in order to provide a rapid temperature pull down. During this relatively high mass flow rate, fan 96 provides, for example, about 3200 cubic feet per minute (CFM) of air flow. As set point SP is approached, the mass flow rate is reduced, since the cooling requirements are being reduced, but the mass flow rate is always maintained at or above a predetermined floor value selected to maintain a predetermined minimum air flow in conditioned space 12 at all times during an active cycle. For example, the mass flow rate of cryogen may be controlled by flow control valve 48 such that at least 2000 CFM is provided by cryogen driven motor 86 and fan 96.

A temperature sensor 112 is disposed to sense the surface temperature of heat exchanger coil section 70 at a location at or near the exit end of heat exchanger coil section 70 to detect when excess surface ice builds up on heat exchanger coil sections 68 and 70. Thus, temperature sensor 112 may be used to enable controller 49 to trigger, and then terminate, a heating cycle for defrosting heat exchanger coil sections 68 and 70. Other sensors may be used to sense when a heating cycle for defrost purposes is necessary, such as by disposing an air velocity sensor (not shown) in the discharge air path 102, with a velocity below a predetermined value indicating that water ice has reduced the air flow to a point where a heating cycle for defrost purposes is necessary. Defrost control for triggering a heating cycle for defrost purposes is shown generally at 114. Defrost control 114 may be also be simple as a timer.

Controller 49, for example, may subtract the temperature RA of conditioned space 12, as indicated by the return air sensor 106, from the set point temperature SP selected via set point selector 104, or from the upper temperature limit of the null temperature zone adjacent to the set point temperature SP, to provide an error signal ΔE which is negative when the temperature of the conditioned space 12 is above set point, and positive when it is below set point. A negative ΔE triggers a cooling cycle, which results in controlling the flow of liquid cryogen 16 from vessel 14 through the first cryogen flow path 60 which includes the first and second heat exchanger coils 68 and 70. The vapor motor 86 is preferably the last active element, associated with the cooling and heating performance of unit 10, in the cooling cycle cryogen flow path 60, as well as in the heating cycle flow path 62, as taught in U.S. Pat. No. 5,285,644, which is assigned to the same assignee as the present application. As hereinbefore stated, if necessary to reduce the operating noise level of unit 10, the cryogen exhaust from vapor motor 86 may be passed through a noise reducing muffler (not shown).

A positive ΔE, provided when the temperature of conditioned space 12 drops to the lower limit of the null temperature zone, triggers a heating cycle, and, as just mentioned, a heating cycle may also be triggered by defrost control 114, such as in response to the coil temperature sensor 112, an air flow sensor, or a timer, to melt water ice which may build up on heat exchanger coils 68 and 70 during a cooling cycle.

A heating cycle is implemented by selecting the second cryogen flow path 62 which is downstream from the hereinbefore described cryogen supply vessel 14, conduit 40, controllable cryogen flow expansion valve 48, and the second outlet 54 of three-way valve 42. When the second cryogen flow path 62 is the active cryogen flow path, controller 49 energizes vent valve 58 to open the small vent outlets 56 and 80 of three-way valves 42 and 72, which allows cryogen pressure to shift cryogen flowing into the inlets 50 and 74 of the three-way valves 42 and 72 from the first outlets 52 and 76 to the second outlets 54 and 78 of the three-way valves 42 and 72.

The second, cryogen flow path 62 includes a first cryogen heating flow path 116 through cryogen heating means 118. The second cryogen flow path 62 includes a conduit 120 which is connected to an inlet 122 of the first cryogen heating flow path 116, and the first cryogen heating flow path 116 has an outlet 124 which is connected to a conduit 126. Conduit 126 is connected to conduit 64 at a tee 127 and thus to the first heat exchanger coil section 68. As illustrated, the first cryogen heating flow path 116 includes a heat exchanger coil 130. The first cryogen heating flow path 116 changes liquid cryogen 16 into vaporized cryogen, and it continues to superheat the vaporized cryogen. A portion of the heated cryogen flows through an optional drain pan loop 132 connected to conduit 64, to defrost a drain pan associated with air conditioning apparatus 100.

Heat may be added to the cryogen as it flows through cryogen heating means 118 from a fuel supply 134 connected to a burner 136 via a conduit 138. Conduit 138 includes a controllable valve 140 and a pressure regulator 142. The fuel from fuel supply 140, for example, may include liquefied natural gas, propane, diesel fuel, and the like. In a stationary application, other heat sources may be used to heat the cryogen, including electrical, hot liquids, steam, waste gases, and the like. When a heating cycle is required to achieve and hold the null temperature band adjacent to the set point temperature SP, or to defrost heat exchanger coil sections 68 and 70, controller 49 opens valve 140 and energizes a heater fan 144, while simultaneously igniting burner 136. The first cryogen heating flow path 116 heats the cryogen to an elevated temperature, such as a temperature in the range of 500° F. to 600° F. (260° C. to 316° C.).

The cryogen heated in the first cryogen heating flow path 116 flows through the first heat exchanger coil section 68 and then to inlet 74 of the second three-way valve 72 via a conduit 146. Vent outlet 80 will be open to the atmosphere since vent valve 58 is opened to initiate a heating cycle. Thus, three-way valve 74 directs the cryogen, now cooled by heat exchange with the return air 98 from conditioned space 12, to the second outlet 78. The second outlet 78 is connected to an inlet 148 of a second cryogen heating flow path 150 through cryogen heating means 118. The second cryogen heating flow path 150 includes a heating coil 152 which super heats the cryogen flowing into heating coil 152, as the cryogen is already vaporized, to an elevated temperature, such as to the same elevated temperature range to which the cryogen was heated by the first cryogen heating flow path 116. An outlet 154 of the second cryogen heating flow path 150 is connected to a conduit 156. Conduit 156 is connected to conduit 82 via a tee 158, and thus to the inlet end 70A of the second heat exchanger coil section 70. The second cryogen flow path 62 then follows the first cryogen flow path 60 through the second heat exchanger coil section 70, conduit 88, back pressure regulator 90, cryogen vapor driven motor means 86, and conduit 92 to exhaust 94.

Cryogen vapor driven motor 86 drives electrical generator means 160, hereinafter called alternator 160, with an output 162 of alternator 160 being connected to controller 49 which detects the frequency of the electrical output and thus the speed of cryogen vapor driven motor means 86. The output 162 of alternator 160 is also applied to a rectifier/regulator 164 which charges a battery 166 and provides an electrical control voltage via conductors 168 and 170 for the operation of controller 49 and the various electrical devices controlled by controller 49. It is to be understood that electrical generator means 160 may be a direct current (DC) generator, instead of an alternator. A toothed wheel and tooth sensor may be used to detect motor RPM with a DC generator, for example.

Safety shutdown valve 46 is responsive to level of the control voltage, shutting off the cryogen flow when alternator 160 fails to provide an adequate output voltage, such as when cryogen vapor driven motor means 86 stops. This prevents flow of cryogen through the motorized expansion valve 46 and three-way valves 42 and 72 as a result of control power failure. Upon control power failure, motorized expansion valve 48 will remain at the last controlled position. Upon control power failure, vent valve 58 will close and an open flow path will exist in each of the three-way valves 42 and 72, eg., from the inlets 50 and 74 to the first outlets 52 and 76. Safety valve 46 may be electrically operated to close the flow opening therethrough, but when compressed air is available safety valve 46 is preferably operated pneumatically, to conserve electrical energy.

A controllable defrost damper 172 is preferably provided at the discharge outlet of air conditioning apparatus 100, with controller 49 closing defrost damper 172 during a defrost cycle, to prevent warm air from being discharged into conditioned space 12. Thus, vapor motor 86 is allowed to run during a defrost cycle, to maintain battery 166 fully charged. Alternatively, instead of providing defrost damper 172, a controllable valve 174 may be connected to conduit 88 at a tee 176 located just prior to the inlet 84 of cryogen vapor driven motor means 86. When controller 49 initiates a defrost cycle, controller 49 opens valve 174 and exhausts the cryogen to the atmosphere, as indicated by arrow 178. Thus, when valve 174 is provided, cryogen vapor driven motor means 86 may be by-passed during a defrost heating cycle. As hereinbefore stated, however, it is preferred that defrost damper 172 be provided, as it is desirable to maintain vapor motor 86 operational during a defrost heat cycle to maintain a full charge on battery 166. Defrost damper 172 only draws electrical energy while it is being moved to a new position, and it thus provides very little adverse affect on air flow provided by fan 96.

An optional enhancement to the heating cycle includes providing heat exchanger means 180 having a heat exchanger coil 182 and a housing 184. Heat exchanger coil 182 is connected in conduit 88 just prior to inlet 84 of cryogen vapor driven motor means 86. Cryogen heating means 118 includes a housing 186, with a conduit, indicated by broken line 188, directing hot exhaust gases generated by burner 136 from housing 186 to housing 184, and heat exchange with heat exchanger coil 182.

Controller 49 controls the flow of cryogen during cooling and heating cycles in response to the error signal ΔE and to the minimum air flow CFM floor value, eg., 2000 CFM, as hereinbefore stated, and also in response to predetermined temperature signals responsive to the temperature and pressure of the cryogen at predetermined points in the cryogen flow paths. For example, the cryogen temperature is preferably sensed by a temperature sensor 190 located at the output of motor operated flow control expansion valve 48, by a temperature sensor 192 located at, or adjacent to, the inlet 68A of the first heat exchanger coil section 68, and by a temperature sensor 194 associated with the second heat exchanger coil section 70.

Temperature sensor 194 is preferably located at a predetermined point within the second heat exchanger coil section 70, upstream from outlet end 70B. In a preferred embodiment of the invention, the first and second heat exchanger coil sections 68 and 70 are approximately equal in size, with the coil sections 68 and 70 being arranged to provide a predetermined degree of superheat at the outlet end 70B of coil section 70. Temperature sensor 194 is disposed directly in the fluid cryogenic flow stream, and is thus used as the primary detector of the degree of superheat. The hereinbefore mentioned temperature sensor 112 is disposed on the external surface of coil section 70, and as such may be used for defrost purposes, as hereinbefore stated. With proper positioning of temperature sensor 194, it may also be used for defrost functions, eliminating the need for temperature sensor 112.

While not essential, in a preferred embodiment of the invention the pressure of the cryogen at a pressure control point 196 located at the outlet 70A of the second heat exchanger coil section 70 is also provided as an input to controller 49. When pressure Sensor 196 is provided, it may be used along with temperature sensor 194 to determine superheat. Temperature and pressure input signals to controller 49 are also indicated generally at 198 and 200, respectively.

When refrigeration unit 10 is shut-down, such as during a null cycle, vapor pressure in refrigeration unit 10 is maintained via a conduit 202 which extends from vapor space 18 of vessel 14 to a tee 204 at conduit 120. Conduit 202 includes a vapor pressure regulator 206.

The teachings of the invention reduce the electrical load on alternator 160, to conserve usage of cryogen while maintaining air flow provided by fan 96 above a predetermined minimum floor value, such as 2000 CFM. This is especially important while unit 10 is operating with relatively low mass flow rates of cryogen as the null temperature band adjacent to set point is being approached. Operating unit 10 with a 3.5 ampere load on alternator 160, for example, dropped the CFM of air flow delivered by fan 96 by 14%, compared with operating unit 10 with no electrical load on alternator 160. Thus, for every additional ampere of load on alternator 160, cryogen vapor driven motor means 86 drops about 4% in RPM and fan 96 provides about 4% less CFM of airflow in conditioned space 12, and vice versa. Since the 2000 CFM floor in the example determines mass flow rate of cryogen as the null temperature band is approached, reducing electrical load on alternator 160 as taught by the invention, enables less cryogen to be used.

Air from conditioned space 12 does not mix with cryogen at any point in the refrigeration unit 10 of the invention. Thus, there is never any contamination of conditioned space 12 with cryogen. Refrigeration unit 10, however, may be used in combination with arrangements which do inject a cryogen, such as $CO_2$, into a conditioned space for fast temperature pull down and/or for load preservation. In such combined applications vessel 14 may be used as the source of the cryogen injected into conditioned space 12.

With certain types of loads in conditioned space 12, the cryogen exhausted from vapor motor 86 may be injected directly into conditioned space 12, deriving still additional cooling from the cryogen.

When conditioned space 12 is compartmentalized to provide a separate space 12' for frozen loads, conduit 40 may be tapped by a conduit 210 at a tee 212 to provide controlled injection of liquid cryogen 16 directly into frozen cargo space 12'. Conduit 210 includes a manual shut-off valve 214, and a controllable liquid cryogen injection valve 216 which enables controller 49 to control the timing and quantity of liquid cryogen injected into cargo space 12'. A temperature sensor 218 associated with frozen cargo space 12' provides a temperature signal for controller 49, so controller 49 may control valve 216 as required to maintain the temperature of frozen cargo space 12' between predetermined temperature limits.

In summary, unit 10, which utilizes the entire heat exchanger means 66, ie., both heat exchanger sections 68 and 70, during heating, cooling and defrost operating modes, and which provides minimal electrical load on alternator 160, results in a highly efficient refrigerant heat exchange arrangement which makes optimum used of space and weight. In transport refrigeration applications, efficiency of design which translates into space and weight savings, maximizes the payload. A heat exchanger which is completely utilized during all operational cycles allows the heat exchanger means to be designed with a lower air pressure drop, resulting in more air flow delivered to the conditioned space 12. This is particularly crucial in cryogenic based refrigeration units. Cryogenic based refrigeration units have more than sufficient cooling capability. With no other source of power other than the pressurized cryogen, air flow capability is a critical factor in mobile applications. For a given cooling capacity, an increase in air flow reduces the temperature differential across the heat exchanger means 66. This is highly important, in order to avoid top freezing of temperature sensitive loads, and the additional air flow avoids localized hot spots in the cargo. The highly efficient heat exchanger means ensures complete vaporization of the liquid cryogen 16. Placing the cryogen driven motor 86 at the end of the cryogen flow path reduces the chance that the cryogen vapor includes any entrained liquid cryogen, which could cause dry ice formation when the cryogen is $CO_2$.

We claim:

1. A refrigeration unit for controlling the temperature of a conditioned space to a predetermined temperature band adjacent to a predetermined set point temperature via heating and cooling cycles, including a supply of pressurized cryogen, a flow path for the cryogen, heat exchanger means in the cryogen flow path associated with the conditioned space, cryogen heating means in the cryogen flow path, and a cryogen driven motor and fan in the cryogen flow path which provides air circulation between the heat exchanger means and the conditioned space, the improvement comprising:

electrical generator means driven by the cryogen driven motor, control means connected to said electrical generator means, said control means selectively configuring the cryogen flow path to provide heating and cooling cycle flow paths, with the cryogen heating means being in the heating cycle flow path, said heat exchanger means having first and second heat exchanger sections each having an inlet and an outlet, said control means including a three-way valve and vent valve means, said three-way valve having an inlet connected to the outlet of the first heat exchanger section, a first outlet connected to the inlet of the second heat exchanger section, a second outlet connected to the cryogen heating means, and a vent outlet, said three-way valve being biased to select the first outlet of the three-way valve when the vent outlet is closed, and operable by cryogen pressure to select the second outlet of the three-way valve when the vent outlet is open, said vent valve means being connected to the vent outlet of said three-way valve, said vent valve means being operable to open and close the vent outlet of the three-way valve, to respectively select heating and cooling cycles.

2. The refrigeration unit of claim 1 wherein the vent valve means is a normally closed, electrically operated valve, which closes the vent outlet of the three-way valve when de-energized, and which opens the vent outlet of the three-way valve when energized.

3. The refrigeration unit of claim 1 wherein the cryogen driven motor is disposed downstream in the cryogen flow path from the second heat exchanger section.

4. The refrigeration unit of claim 3 wherein the cryogen heating means exhausts heated gases, and including a heat exchange coil disposed in the cryogen flow path between the cryogen driven motor and the second heat exchanger section, and means directing the heated exhaust gases of the cryogen heating means in heat exchange relation with said heat exchange coil, to enhance the operation of the cryogen driven motor during a heating cycle.

5. The refrigeration unit of claim 1 wherein the control means includes a second three-way valve, and the cryogen heating means includes first and second cryogen heating flow paths each having inlet and outlet ends, said second three-way valve having an inlet connected to the supply of pressurized cryogen, a first outlet connected to the inlet of the first heat exchanger section, a second outlet connected to the inlet end of the first cryogen heating flow path, and a vent outlet which when closed and open respectively connects the inlet of the second three-way valve to the first and second outlets of the second three-way valve, the outlet ends of the first and second cryogen heating flow paths being connected to the inlets of the first and second heat exchanger sections, with the second outlet of the three-way valve which is connected between the first and second heat exchanger sections being connected to the inlet end of the second cryogen heating flow path, and wherein the vent valve means is a single normally closed valve, with said single normally closed valve also being connected to the vent outlet of the second three-way valve, whereby the vent outlets of the three-way valves are both connected to the atmosphere when the single normally closed valve is open.

6. The refrigeration unit of claim 5 wherein the cryogen driven motor is disposed downstream in the cryogen flow path from the second heat exchanger section.

7. The refrigeration unit of claim 6 wherein the cryogen heating means exhausts heated gases, and including a heat exchange coil disposed in the cryogen flow path between the cryogen driven motor and the second heat exchanger section, and means directing the heated exhaust gases of the heating means in heat exchange relation with said heat exchange coil, to enhance the operation of the cryogen driven motor during a heating cycle.

8. The refrigeration unit of claim 1 including:

a battery connected to the electrical generator means, and control means, defrost means initiating a heating cycle to defrost the heat exchanger means, and damper means operable during a defrost heating cycle to block air circulation between the heat exchanger means and the conditioned space, wherein the cryogen driven motor continues to operate during a defrost heating cycle to charge said battery.

9. The refrigeration unit of claim 1 including a motor operated cryogen flow control valve disposed between the supply of pressurized cryogen and the heat exchanger means, said motor operated cryogen flow control valve being energized by the control means in response to predetermined parameters of the cryogen flow path, when a change in flow rate of the cryogen is required.

10. The refrigeration unit of claim 1 including safety shut-off valve means disposed in the cryogen flow path between the supply of pressurized cryogen and the heat exchanger means, said safety shut-off valve means being responsive to the voltage level provided by the electrical generator means, closing the cryogen flow path when said voltage level drops below a predetermined value.

11. The refrigeration unit of claim 1 wherein the cryogen driven motor is disposed in the cryogen flow path downstream from the second heat exchanger section, and including cryogen pressure regulator means in the cryogen flow path between the cryogen driven motor and the second heat exchanger section.

12. The refrigeration unit of claim 11 wherein the cryogen pressure regulator means includes a back pressure regulating valve which automatically maintains the vapor pressure of the cryogen above a predetermined value.

13. The refrigeration unit of claim 9 wherein the cryogen pressure regulator means includes a motor operated back pressure regulating valve, said motor operated back pressure regulating valve being operated by the control means in response to predetermined parameters of the refrigeration unit and conditioned space.

14. The refrigeration unit of claim 1 including a motor operated cryogen flow control valve and a motor operated back pressure regulating valve disposed in the cryogen flow path, said motor operated cryogen flow control valve being located between the supply of pressurized cryogen and the heat exchanger means, and said motor operated back pressure regulating valve being located in the cryogen flow path downstream from the heat exchanger means, said motor operated cryogen flow control valve and said motor operated back pressure regulating valve being operated by the control means in response to predetermined parameters of the refrigeration unit and conditioned space.

15. The refrigeration unit of claim 1 including a second conditioned space to be temperature controlled by the refrigeration unit to a predetermined temperature band adjacent to a second set point temperature, and means for injecting cryogen from the supply of pressurized cryogen directly into said second conditioned space, as required to maintain the temperature of said second conditioned space within said predetermined temperature band.

16. A refrigeration unit for controlling the temperature of a conditioned space to a predetermined temperature band adjacent to a predetermined set point temperature via heating and cooling cycles, including a supply of pressurized cryogen, a flow path for the cryogen, heat exchanger means in the cryogen flow path associated with the conditioned space, cryogen heating means in the cryogen flow path, and a cryogen driven motor and fan in the cryogen flow path which provides air circulation between the heat exchanger means and the conditioned space, the improvement comprising:

electrical generator means driven by the cryogen motor, control means connected to said electrical generator said control means selectively configuring the cryogen flow path to provide heating and cooling cycle flow paths, with the cryogen heating means being in the heating cycle flow path, said heat exchanger means having first and second heat exchanger sections each having an inlet and an outlet, said heating means having first and second cryogen heating flow paths each having inlet and outlet ends, said control means including first and second three-way valves each having an inlet, first and second outlets, and a vent outlet, said first and second three-way valves each being biased to select the first outlet when the vent outlet is closed, and operable by cryogen pressure to select the second outlet when the vent outlet is open, said first three-way valve being disposed in the cryogen flow path between the supply of pressurized cryogen and the first heat exchanger section, said second three-way valve being disposed in the cryogen flow path between the first and second heat exchanger sections, and a controllable valve connected to open the vent outlets of the first and second three-way valves to the atmosphere when open, and closing the vent outlets of the first and second three-way valves when closed.

17. The refrigeration unit of claim 16 wherein the controllable valve means is a normally closed electrically operated valve which closes the vent outlets of the three-way valves when de-energized, and which opens the vent outlets of the three-way valves when energized.

18. The refrigerator unit of claim 16 wherein the inlet of the first three-way valve is connected to the supply of pressurized cryogen, the first outlet of the first three-way valve is connected to the inlet of the first heat exchanger section, the second outlet of the first three-way valve is connected to the inlet end of the first cryogen heating flow path, the outlet ends of the first and second cryogen heating flow paths being connected to the inlets of the first and second heat exchanger sections, and wherein the inlet of the second three-way valve is connected to the outlet of the first heat exchanger section, the first outlet of the second three-way valve is connected to the inlet of the second heat exchanger section, and the second outlet of the second three-way valve is connected to the inlet end of the second cryogen heating flow path.

* * * * *